3,095,432
PROCESS FOR THE PRODUCTION OF OLEFINIC ACID ESTERS
Hans Feichtinger, Dinslaken, and Heinz Noeske, Oberhausen-Sterkrade, Germany, assignors to Ruhrchemie Aktiengesellschaft, Oberhausen-Holten, Germany
Filed Oct. 3, 1960, Ser. No. 60,024
Claims priority, application Germany Oct. 8, 1959
3 Claims. (Cl. 260—410.9)

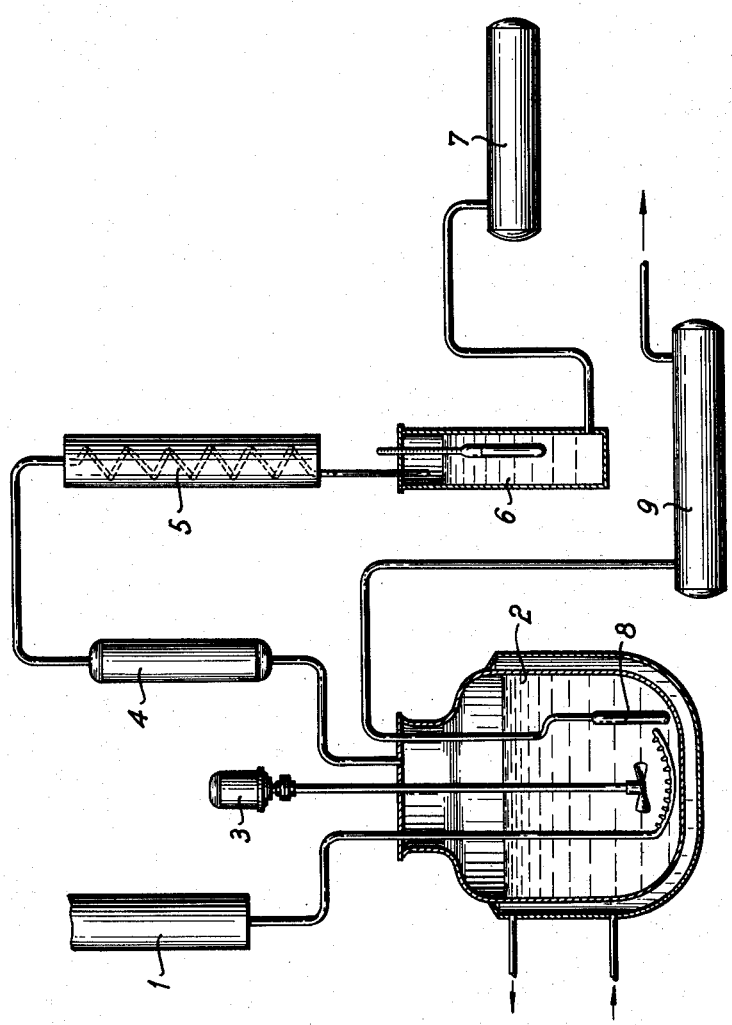
INVENTORS:
HANS FEICHTINGER,
HEINZ NOESKE
by Mestern & Kollin,
ATTORNEYS

United States Patent Office 3,095,432
Patented June 25, 1963

The invention relates to a process for the manufacture of olefinic acid esters and, more particularly, to an esterification with the use of a non-reacting esterification catalyst.

In the esterification of carboxylic acids, especially of fatty acids, with alcohols while removing the water of reaction formed by means of an entrainer, the employment of catalysts is known.

Suitable esterification catalysts are, e.g., sulfuric acid, hydrochloric acid, phosphoric acid and aromatic sulfonic acids. These materials are usable only if the reactants contain no groups which are reactive with acid catalysts. If olefinic double bonds are present, addition-, condensation- and polymerisation reactions will occur which render difficult the formation of the desired esters or even make it completely impossible. In these cases, the reaction is inhomogeneous, and dark-colored and unusable reaction products are formed.

It has been found that it is possible to produce olefinic acid esters without these drawbacks by introducing aliphatic or cyclic alcohols into the olefinic acids, heated to 100–180° C., preferably to 140–160° C., and containing an esterification catalyst possessing no polymerizing action and being insoluble in the reaction mixture. The water of reaction is carried over and out of the reaction mixture by unreacted alcohol vapors. Acid inorganic salts, preferably bisulfates are suitable as esterification catalysts. Especially advantageous is the use of potassium bisulfate.

According to the invention, unsaturated aliphatic or cycloaliphatic organic acids can be esterified which contain 10 to 20 carbon atoms in the molecule. The aliphatic, cycloaliphatic or cyclic alcohols which are used for esterification may contain up to 10 carbon atoms per molecule. With lower alcohols ($C_1$ to $C_4$), the process can be carried out at normal atmospheric pressure. With higher alcohols ($C_5$ to $C_{10}$), the unconverted alcohol vapors and the reaction water may also be removed by application of a slight vacuum.

The process according to the invention may be effected in the apparatus illustrated in the accompanying drawing. The olefinic acid, together with the catalyst, for instance potassium bisulfate in an amount of 5–15%, is fed to the reactor 2 which is surrounded by a heating jacket. The latter may be supplied with steam or oil. The heterogeneous components in the reactor are intimately mixed by means of stirrer 3. From vessel 1, the alcohol to be esterified, for instance methanol or ethanol, is added to the heterogeneous mixture of acid and catalyst, which is heated to 100–180° C. The alcohol immediately is evaporated as soon as it enters into the heated olefinic acid. The alcohol vapor is finely distributed by nozzles below the stirrer inside the agitated mixture of olefinic acid and catalysts. By using an excess alcohol and by distilling it during the process, the by-product water is carried over, as soon as it is formed, by the alcohol vapors.

The vapors escaping from reactor 2 are passed through a small column 4, wherein the entrained olefinic acid is separated and returned to the reaction vessel. The vapors are condensed in condenser 5, alcohol and water are collected in measuring vessel 6. By physical methods, e.g., with an aerometer, the water content of the condensate in the measuring vessel 6 and therewith the end-point of the esterification may easily be determined. From measuring vessel 6, the water-containing alcohol may be diverted to stock vessel 7 and regenerated in the conventional manner.

After complete esterification of the acid, the ester is sucked off via the filter candle 8 into the stock vessel 9. The potassium bisulfate remaining in the reaction vessel may be used for several esterification processes without loss of its catalytic and physical properties. The esterification is carried out without the aid of alien solvents or entrainers so that good "space-time-yields" are obtained.

With the process according to the invention almost quantitative yields are obtained since the catalyst does not react with the olefinic double-bonds. Since the olefinic acid esters thus obtained are very pure, they may be used without previous distillation immediately for further chemical conversions, e.g., for the oxo process according to O. Roelen and succeeding hydrogenation to oxymethylene acid esters.

The invention now will be further explained by the following examples. However, it should be understood that these are given merely by way of illustration, not of limitation, and that numerous changes may be made in the details without departing from the spirit and the scope of the invention as hereinafter claimed.

*Example 1*

Into the reaction container 2 shown in the drawing, 1000 parts by weight oleic acid of a neutralization number of 208 and an ozone iodine number of 94 are introduced, together with 100 parts potassium bisulfate, and are held at a temperature of 180° C. Within 8 hours, 1400 parts methanol are introduced into the reaction mixture from a dropping funnel. The methanol evaporates instantaneously and partially reacts with the oleic acid. The unconverted alcohol vapors and the evaporated reaction water escape via column 4 and are condensed in condenser 5. The alcohol-water mixture is collected in measuring vessel 6. After 7 hours, its density has decreased from an initial 0.84 to 0.78. By filtering from the used catalyst, 1030 parts oleic acid methylester of a saponification number of 195, a neutralization number of 1.28 (corresponding to 0.65% nonconverted oleic acid) and an ozone iodine number of 90 are obtained.

*Example 2*

Reaction vessel 2 was charged with 1500 parts oleic acid of a neutralization number of 208 and an ozone iodine number of 94, together with 100 parts potassium bisulfate, in the same manner as in Example 1. Within 10 hours, 1310 parts ethanol were dropped into the said mixture. During that time, the density of the ethanol-water-mixture obtained diminished from 0.865 to 0.795. After filtering from the used catalyst, 1600 parts oleic acid ethyl ester of a saponification number of 186, a neutralization number of 1.4 (corresponding to 0.71% unconverted oleic acid), and an ozone iodine number of 86 were obtained.

*Example 3*

Corresponding to Example 1, 540 parts undecylenic acid of a neutralization number of 304 and an ozone iodine number of 137, together with 40 parts potassium bisulfate were heated in the reaction vessel for 5 hours to 140° C. During that time, 600 parts methanol were dropped into this esterification mixture. During conversion the density of the condensed methanol-water-mixture diminished from 0.875 to 0.79. After filtering from the catalyst, 560 parts undecylic acid methylester of a saponification number of 280, a neutralization number of 2.1 (corresponding to 0.7% unesterified acid), and an ozone iodine number of 126 were obtained.

Example 4

In the reaction vessel 2, 1145 parts oleic acid having a neutralization number of 208 and an ozone iodine number of 94, together with 100 parts potassium bisulfate, were heated to 140° in the same manner as in Example 1. Into this mixture 1200 parts isopropyl alcohol were dropped within 14 hours. The density of the obtained isopropyl alcohol-water-mixture diminished during that time from 0.815 to 0.789. After filtering off the catalyst, 1270 parts oleic acid isopropyl ester of a saponification number of 177, a neutralization number of 1.58 (corresponding to 0.8% unconverted oleic acid), and an ozone iodine number of 82 were obtained.

Example 5

In the reaction vessel 2, 1080 parts oleic acid having a neutralization number of 208 and an ozone iodine number of 94, together with 100 parts of potassium bisulfate, were heated to 180° C. Instead of a measuring container, a collecting vessel with a vacuum connection was used. The conversion was performed initially at a vacuum of 60 mm. Hg, later on at 20 mm. Hg. Within 8 hours, 850 parts of isononyl alcohol were dropped into this mixture. After finishing the conversion, which was controlled by determining the neutralization number, the catalyst was removed by filtration. As end product 1450 parts oleic acid isononylester of a saponification number of 138, a neutralization number of 1.58 (corresponding to 0.56% unconverted oleic acid), and an ozone iodine number of 66 were obtained.

Example 6

In the reaction vessel 2, 540 parts undecylenic acid, having a neutralization number of 304, together with 40 parts potassium bisulfate, were heated to 180° C. As described in Example 5, a collecting vessel with a vacuum connection was used instead of measuring vessel 6. The conversion was performed at a vacuum of 50 mm. Hg. Within 7 hours, 620 parts cyclopentylcarbinol were dropped into this mixture. After finishing the conversion, which was controlled by determining the neutralization number, the catalyst was removed by filtration. As end product 730 parts undecylenic acid cyclopentylmethylester with a saponification number of 206 and a neutralization number of 2.1 (corresponding to 0.7% unconverted undecylenic acid) were obtained.

All parts given in these examples, unless otherwise stated, are parts by weight.

We claim as our invention:

1. A process for the manufacture of olefinic acid esters from olefinic acids and alcohols, which consists of placing unsaturated aliphatic acids together with 5 to 15 percent by weight thereof of potassium bisulfate in a reaction zone, heating the contents of said reaction zone to 140–180° C., continuously introducing therein in small portions, and immediately vaporizing, an alcohol having one to 10 carbon atoms in its molecule, selected from the group consisting of aliphatic and cycloaliphatic alcohols, passing the vaporized alcohol directly through said acids, and continuously removing the water of reaction formed together with unreacted alcohol under a vacuum.

2. A process for the manufacture of olefinic acid esters from olefinic acids and alcohols, which consists of placing unsaturated aliphatic acids having 10 to 20 carbon atoms in their molecule in a reaction zone together with 5 to 15 percent by weight thereof of potassium bisulfate, heating the contents of said reaction zone to 140–180° C., continuously introducing therein in small portions, and immediately vaporizing, an alcohol having 1 to 10 carbon atoms in its molecule, selected from the group consisting of aliphatic and cycloaliphatic alcohols, passing the vaporized alcohol directly through said acids within a time of 5 to 14 hours, and continuously removing the water of reaction formed together with unreacted alcohol under a vacuum.

3. A process for the manufacture of olefinic acid esters from olefinic acids and alcohols, which consists of placing unsaturated aliphatic acids having 10 to 20 carbon atoms in their molecule in a reaction zone together with 5 to 15 percent by weight thereof of potassium bisulfate, heating the contents of said reaction zone to 140–180° C., continuously introducing therein in small portions, and immediately vaporizing, a monovalent alcohol having 1 to 10 carbon atoms in its molecule, selected from the group consisting of aliphatic and cycloaliphatic alcohols, passing the vaporized alcohol directly through said acids within a time of 5 to 14 hours, and continuously removing the water of reaction formed together with unreacted alcohol under a vacuum.

References Cited in the file of this patent

UNITED STATES PATENTS

| Number | Name | Date |
|---|---|---|
| 2,585,884 | Whetstone et al. | Feb. 12, 1952 |
| 2,637,736 | Merz | May 5, 1953 |
| 2,759,967 | Cash et al. | Aug. 21, 1956 |
| 2,766,273 | Bruins et al. | Oct. 9, 1956 |

OTHER REFERENCES

Groggins: "Unit Processes in Organic Synthesis," McGraw-Hill Book Co., Inc., 1938 (pages 544 to 556).